May 2, 1950
D. G. FAWKES
2,506,074
VALVE AND HANDLE MECHANISM FOR
PORTABLE FIRE EXTINGUISHERS
Filed Nov. 7, 1946
2 Sheets—Sheet 1
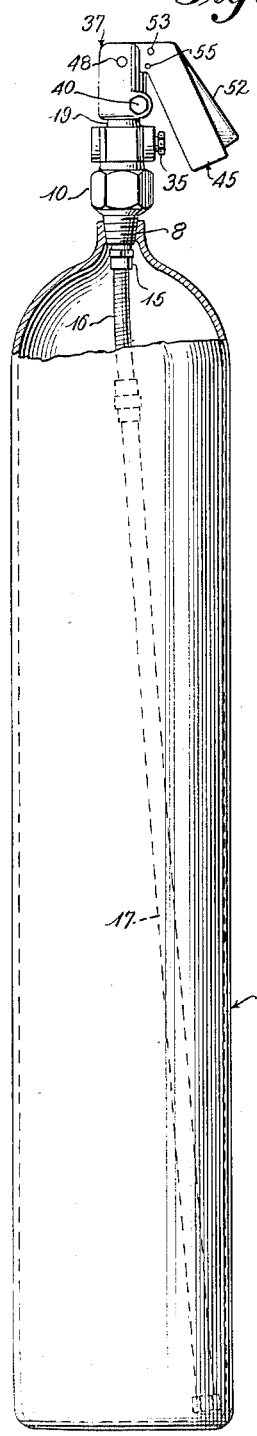
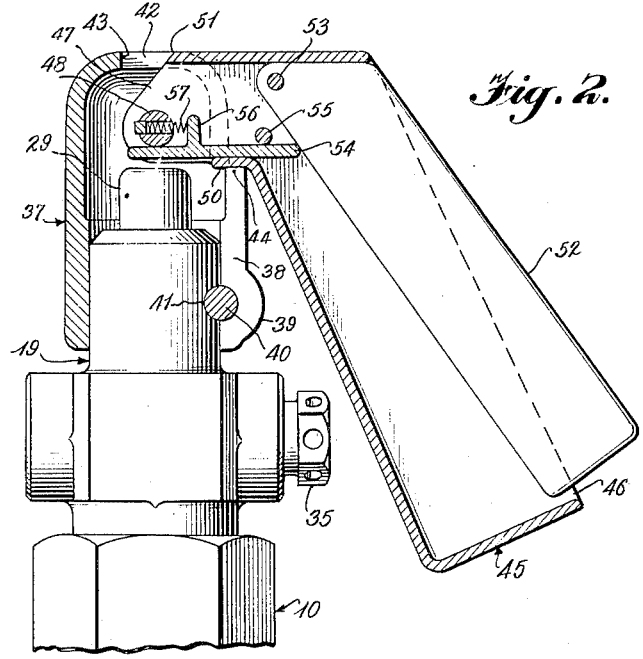
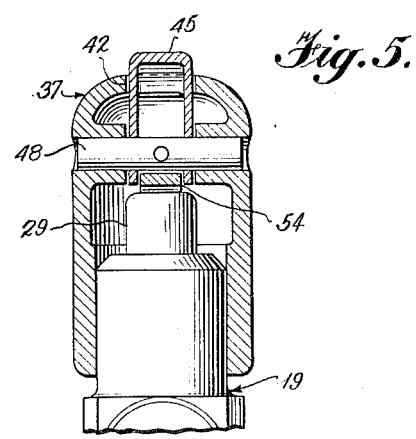
Inventor
Donald G. Fawkes
By Donald Myers
Attorney May 2, 1950 — D. G. FAWKES — 2,506,074
VALVE AND HANDLE MECHANISM FOR PORTABLE FIRE EXTINGUISHERS
Filed Nov. 7, 1946 — 2 Sheets-Sheet 2
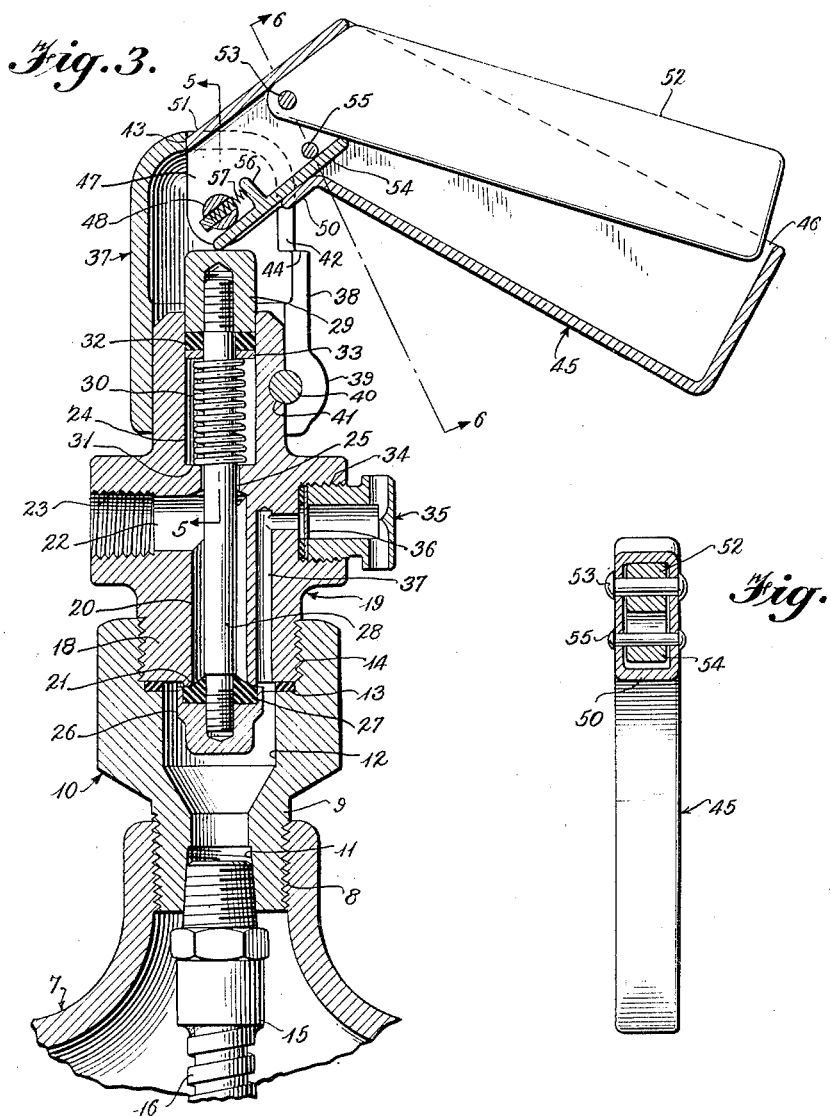
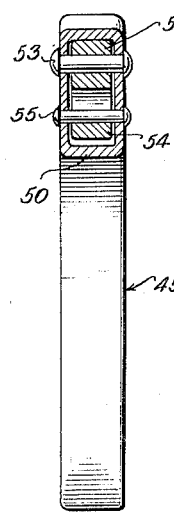
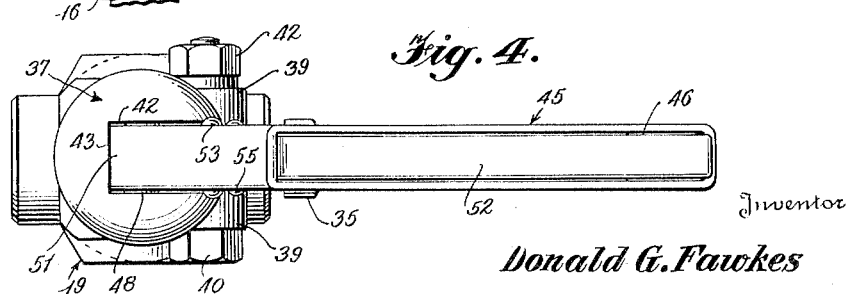
Inventor
Donald G. Fawkes
By L. Donald Myers
Attorney Patented May 2, 1950

2,506,074

UNITED STATES PATENT OFFICE 2,506,074

VALVE AND HANDLE MECHANISM FOR PORTABLE FIRE EXTINGUISHERS

Donald G. Fawkes, Chicago, Ill., assignor to Cardox Corporation, Chicago, Ill., a corporation of Illinois Application November 7, 1946, Serial No. 708,401

11 Claims. (Cl. 251—134)

This invention relates to new and useful improvements in a valve and handle mechanism for portable fire extinguishers.

It is the primary object of this invention to provide a valve for controlling the discharge of a high pressure medium, such as carbon dioxide, from a portable fire extinguisher and to include as a part of the mechanism a handle that may be employed for carrying and manipulating the extinguisher and for actuating the valve when thus employed.

A further important object of the invention is the provision of a portable fire extinguisher valve handle that is movable between a collapsed, non-carrying position, in which it cannot be operated for actuating the extinguisher valve, and an extended position, in which it is operable for actuating the valve, said movements occurring in one direction when the extinguisher is lifted by the handle and in the opposite direction when the extinguisher is placed on a suitable supporting surface and the handle is released.

Still another object of the invention is the provision of a novel form of squeeze-grip valve for portable fire extinguishers.

Other objects and advantages of the invention will be apparent during the course of the following description.

In the accompanying drawings forming a part of this specification and in which like numerals are employed to designate like parts throughout the same, Figure 1 is a side elevational view, partly broken away, of the improved valve and handle mechanism embodying this invention and applied to a conventional portable fire extinguisher cylinder or container, Figure 2 is a fragmentary, enlarged, partly elevational and partly vertical sectional view of the said valve and handle mechanism, Figure 3 is a vertical sectional view of the complete valve and handle mechanism shown attached to the throat of a portable fire extinguisher cylinder or container, Figure 4 is a top plan view of the said valve and handle mechanism, Figure 5 is a detail vertical sectional view taken on line 5—5 of Fig. 3, and Figure 6 is a detail sectional view taken on line 6—6 of Fig. 3.

In the drawings, wherein for the purpose of illustration is shown the preferred embodiment of this invention, and first particularly referring to Fig. 1, the reference character 7 is employed for designating in its entirety a conventional portable fire extinguisher cylinder or container which is provided with the usual open-ended and internally screw-threaded throat 8.

This cylinder or container is intended to be charged in the usual way with a high pressure fluid medium, such as liquid carbon dioxide, for use in effecting the extinguishment of fires.

Figs. 1 and 3 best illustrate the cylinder or container throat 8 as having threaded therein the reduced portion 9 of the adapter 10. The bore of this adapter is stepped to provide the internally threaded end portion 11, the smooth-surfaced portion 12, the seat 13, and the internally threaded portion 14.

The internally threaded portion 11 is intended to accommodate the threaded end of the coupling 15 that is attached to one end of the flexible, metallic hose section 16 of the dip-tube that further includes the stiff metal pipe 17. This dip-tube extends from the adapter 10 to a point adjacent the bottom of the fire extinguisher cylinder or container 7.

The internally threaded portion 14 of the bore of the adapter 10 is employed for accommodating the threaded end portion 18 of the valve body 19. This valve body is properly bored to provide a fluid passageway 20 that opens through the end face of the end portion 18 of the valve body. An annular valve seat 21 is formed on the end surface of the valve body concentric with the fluid passage 20. The valve body 19 is further bored to provide a lateral passage 22 that communicates with the inner end of the passage 20 and opens through the side of the valve body. This lateral passage 22 is internally screw-threaded at 23 to accommodate any suitable or desired form of discharge mechanism for the high pressure fluid extinguisher medium. For example, a flexible hose, with a suitable nozzle at its outer end may be attached to the valve body 19 by means of this threaded passageway portion 23 or a suitable nozzle may be directly attached to the valve body 19 by this threaded portion 23.

The upper end portion of the valve body 19 is bored at 24 and a reduced opening 25 connects the passageway 20 with the bore portion 24.

A valve head 26 is positioned in the smooth-surfaced portion 12 of the bore of the adapter 10. This valve head is provided with the seating disc 27, formed of neoprene, or other similar material. A valve stem 28 is suitably connected to the head 26 and extends axially through the fluid passage 20, the opening 25, and the bore portion 24. An actuating button 29 is threadedly attached to the upper end of this valve stem. The seating spring 30 is positioned over the valve stem 28 so as to bear at one end against the shoulder 31 provided by the difference in diameters of the opening 25 and the bore 24. Suitable packing means 32 are positioned on the valve stem 28 between the upper end of the spring 30 and the button 29. A metallic washer 33 is interposed between the packing 32 and the adjacent end of the spring to prevent damage of the packing. It will be seen by inspecting Fig. 3 that the elements 26 to 33 collectively provide a check-valve for controlling flow of the fluid through the passages 20 and 22. The spring 30 normally maintains the packing washer 27 of the valve head 26 in engagement with the valve body seat 21. By applying pressure to the operating button 29, the valve will be unseated.

The valve body 19 further is provided with an internally screw-threaded recess 34 for accommodating the conventional, anti-recoil plug 35 with its rupturable disc 36. This opening is connected by the angular passageway 37, formed in the valve body 19, to the end face of the valve body outwardly of the valve seat 21. Consequently, any pressure that prevails in the smooth-surfaced portion 12 of the bore of the adapter 10 will be applied to the inner face of the rupturable disc 36. This disc will function to blow out and release the high pressure fluid medium from the cylinder or container 7 in the event the pressure of said fluid exceeds a predetermined maximum value.

The several figures of the drawings disclose the fluid release valve as being operable by a novel form of squeeze-grip handle structure. This handle structure is attached to the upper end portion of the valve body 19, from which projects the valve-operating button 29, by means of the mounting cap 37. This cap is split longitudinally at 38 and is provided with apertured ears 39 through which extends the headed bolt 40. The reduced upper end portion of the valve body 19 is provided with a transverse groove 41 that will accommodate approximately half of the bolt 40 when the latter is inserted through the apertures 39 after the cap 37 has been properly positioned on the upper end portion of the valve body 19. By tightening the nut 42 on the end of the bolt 40, after the latter is thus positioned, the split portion of the cap 37 can be contracted so as to tightly attach the cap to the valve body.

The upper end portion of the cap 37 is provided with a handle opening 42. This opening is so shaped that its upper edge 43 forms one movement-limiting abutment while its lower edge 44 provides a second movement-limiting abutment for the end portion of the handle 45 that projects into the cap through the opening 42.

The handle 45 is of hollow construction and is formed with the longitudinal opening 46 along one side wall and an opening 47 at its inner end. A pivot pin 48 pivotally connects the inner open end portion of the handle 45 to the cap 37.

By comparing the illustrations provided by Figs. 2 and 3, it will be seen that the handle 45 is permitted to occupy two positions. Fig. 2 discloses the handle 45 in what will be termed its normal, inoperative, collapsed position. In this position, the portion 50 of the handle rests against the stop or abutment-forming edge 44 of the handle opening 42. Fig. 3 illustrates the handle 45 in its operative or extended position in which the portion 51 of the handle bears against the stop or abutment-forming edge 43 of the handle opening 42. The extended or operative position of the handle 45, illustrated in Fig. 2, is the position the handle occupies when it is gripped by a person desiring to use the fire extinguisher and the extinguisher is being carried by said operator. The collapsed or inoperative position illustrated in Fig. 2 is the position assumed by the handle 45 when the portable extinguisher is rested on a suitable supporting surface and the handle is released.

A squeeze-grip trigger 52 is arranged in the hollow of the handle 45 so as to project through the longitudinal opening 46. A pivot pin 53 connects the trigger 52 to the handle 45. To enable the trigger 52 to be employed for unseating the valve head 26, when the trigger is squeezed, and thereby moved entirely into the hollow of the handle 45, a sliding or reciprocal plunger 54 is positioned in the open end portion of the handle 45. This plunger is guided in its movements by the wall portion 50 of the handle 45, the pivot pin 48 of the handle, and an additional pin 55. A stop shoulder 56 is formed on the plunger 54 and cooperates with the handle pivot pin 48 for limiting the distance to which the plunger can be moved inwardly by the trigger 52. A transverse spring 57 projects from an opening formed in the handle pivot pin 48 and bears against the abutment 56 of the plunger 54 to normally urge the plunger outwardly into engagement with the trigger 52.

By examining the disclosure provided by Fig. 2, it will be seen that when the handle 45 is in its inoperative, or collapsed position, the plunger 54 cannot function to apply valve-unseating pressure to the operating button 29 when the trigger 52 is squeezed. This is due to the fact that the plunger 54 is arranged horizontally and would move parallel to the top surface of the valve-operating button 29. However, when the handle 45 is elevated, as a result of an operator picking up and carrying the weight of the portable extinguisher by means of the handle 45, see Fig. 3, the plunger 54 has been moved bodily into an angular position with respect to the top surface of the valve-operating button 29. When in this position, squeezing pressure applied to the trigger 52 will cause the plunger 54 to move longitudinally inwardly and apply operating pressure to the valve button 29.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. A valve and handle mechanism for portable fire extinguishers, comprising a valve body adapted to be attached to an extinguisher container, said body having a passage therethrough for the flow of a high pressure fluid and a valve seat on its inner end face concentric with said passage, a valve head engageable with said seat and having a stem extending through the valve body, an operating button on the end of the stem projecting beyond the valve body, a cap, having a handle opening, fitted on the valve body and enclosing said operating button, a handle having one end portion projecting into the cap through its opening, means for pivotally connecting said handle end to the cap to permit the handle, when engaging one edge of said cap opening, to occupy an extended position for carrying an attached extinguisher and when engaging the opposite edge of said opening to occupy an inoperative, collapsed position, and means carried by the handle and operable to depress the valve stem button for unseating the valve only when the handle is in its extended position.

2. A valve and handle mechanism for portable fire extinguishers, comprising a valve body adapted to be attached to an extinguisher container and having a spring-seated valve provided with an operating button projecting beyond one end of the body, a cap, having a handle opening, fitted on the valve body to enclose said operating button, a handle having a portion projecting into the cap through its opening, means for pivotally connecting said handle to the cap to permit the handle, when engaging one edge of said cap opening, to occupy an extended position for carrying an attached extinguisher and when engaging the opposite edge of said opening to occupy a collapsed position, and means carried by the handle and movable relative thereto to unseat the valve through actuation of its operating button only when the handle is in its extended position.

3. A valve and handle mechanism for portable fire extinguishers, comprising a valve body adapted to be attached to an extinguisher container and having a spring-seated valve provided with an operating button projecting beyond one end of the body, a handle-mounting member connected to the valve body adjacent said operating button, a handle pivotally connected to said mounting member, cooperating means on said handle and mounting member for holding the handle either in an extended position for carrying an attached extinguisher or in a collapsed position, and means carried by the handle and movable relative thereto to unseat the valve through actuation of its operating button only when the handle is in its extended position.

4. A valve and handle mechanism for portable fire extinguishers, comprising a valve body adapted to be attached to an extinguisher container, said body having a passage therethrough for the flow of a high pressure fluid and a valve seat on its inner end face concentric with said passage, a valve head engageable with said seat and having a stem extending through the valve body, an operating button on the end of the stem projecting beyond the valve body, a handle-mounting member connected to the valve body adjacent said operating button, a handle pivotally connected to said mounting member, cooperating means on said handle and mounting member for holding the handle either in an extended position for carrying an attached extinguisher or in a collapsed position, and means carried by the handle and movable relative thereto to unseat the valve through actuation of its operating button only when the handle is in its extended position.

5. A valve and handle mechanism for portable fire extinguishers, comprising a valve body adapted to be attached to an extinguisher container, said body having a passage therethrough for the flow of a high pressure fluid and a valve seat on its inner end face concentric with said passage, a valve head engageable with said seat and having a stem extending through the valve body, an operating button on the end of the stem projecting beyond the valve body, a cap having a handle opening fitted on the valve body and enclosing said operating button, a handle of hollow construction having an end opening and a longitudinal opening in one side wall, said handle having its open end projecting into the cap through its handle opening, means for pivotally connecting said handle end to the cap to permit the handle, by engaging opposite edges of said cap opening, to occupy an extended position for carrying an attached extinguisher and to occupy a collapsed position, a squeeze-grip trigger pivoted in the hollow handle and projecting through said longitudinal opening, and means carried in the open end portion of the handle and operable by said trigger to depress the valve stem button for unseating the valve only when the handle is in its extended position.

6. A valve and handle mechanism for portable fire extinguishers, comprising a valve body adapted to be attached to an extinguisher container and having a spring-seated valve provided with an operating button projecting beyond one end of the body, a cap having a handle opening fitted on the valve body to enclose said operating button, a handle of hollow construction having an end opening and a longitudinal opening in one side wall, said handle having its open end projecting into the cap through its handle opening, means for pivotally connecting said handle end to the cap to permit the handle, by engaging opposite edges of said cap opening, to occupy an extended position for carrying an attached extinguisher and to occupy a collapsed position, a squeeze-grip trigger pivoted in the hollow handle and projecting through said longitudinal opening, and means carried in the open end portion of the handle and operable by said trigger to depress the valve stem button for unseating the valve only when the handle is in its extended position.

7. A valve and handle mechanism for portable fire extinguishers, comprising a valve body adapted to be attached to an extiguisher container and having a spring-actuated valve provided with an operating button projecting beyond one end of the body, a handle-mounting member connected to the valve body adjacent said button, a handle of hollow construction having an end opening and a longitudinal opening in one side wall, said handle having its open end projecting into the mounting member, means for pivotally connecting said handle end to the mounting member to permit the handle, by engaging opposed surfaces of the mounting member to occupy an extended position for carrying an attached extinguisher and to occupy a collapsed position, a squeeze-grip trigger pivoted in the hollow handle and projecting through said longitudinal opening and means carried in the open end portion of the handle and operable by said trigger to depress the valve stem button for unseating the valve only when the handle is in its extended position.

8. A handle mechanism for attachment to the fluid release valve of a portable fire extinguisher, comprising a mounting cap having a handle opening, a handle having one end portion projecting into the cap through its opening, means for pivotally connecting said handle end to the cap to permit the handle, by engaging one edge of said cap opening, to occupy an extended position in which it can be employed for carrying a portable extinguisher to which the handle mechanism is attached and when engaging the opposite edge of said opening to occupy a collapsed position, and means connected to the handle for movement relative thereto and operable only when the handle is in its extended position for actuating the fluid release valve of the fire extinguisher.

9. A handle mechanism for attachment to the fluid release valve of a portable fire extinguisher, comprising a handle-mounting member, a handle pivotally connected to said mounting member, cooperating means on said handle and mounting member for holding the handle either in an extended position for carrying an attached extinguisher or in a collapsed position, and means connected to the handle for movement relative thereto and operable only when the handle is in its extended position for actuating the fluid release valve of the attached extinguisher.

10. A handle mechanism for attachment to the fluid release valve of a portable fire extinguisher, comprising a handle-mounting member, a handle of hollow construction having an end opening and a longitudinal opening in one side wall, means for pivotally connecting the end of the handle having the opening to the mounting member, cooperating means on said handle and mounting member for holding the handle either in an extended position for carrying an attached extinguisher or in a collapsed position, a squeeze-grip trigger pivoted in the hollow handle and projecting through said longitudinal opening, and means carried in the open end portion of the handle and operable by said trigger only when the handle is in its extended position for actuating the fluid release valve of the attached extinguisher.

11. A handle mechanism for attachment to the fluid release valve of a portable fire extinguisher, comprising a handle-mounting member, a handle of hollow construction having an end opening and a longitudinal opening in one side wall, means for pivotally connecting the end of the handle having the opening to the mounting member, cooperating means on said handle and mounting member for holding the handle either in an extended position for carrying an attached extinguisher or in a collapsed position, a squeeze-grip trigger pivoted in the hollow handle and projecting through said longitudinal opening, and a plunger slidably positioned in the open end portion of the handle and operable by said trigger only when the handle is in its extended position for actuating the fluid release valve of the attached extinguisher.

DONALD G. FAWKES.

REFERENCES CITED

The following references are of record in the file of this patent:

UNITED STATES PATENTS

| Number | Name | Date |
|---|---|---|
| 2,258,869 | Towart | Oct. 14, 1941 |
| 2,409,647 | Stroop | Oct. 22, 1946 |